June 10, 1930. J. E. ROUSSEAU 1,763,370
ROTARY CUTTER
Filed Aug. 22, 1929
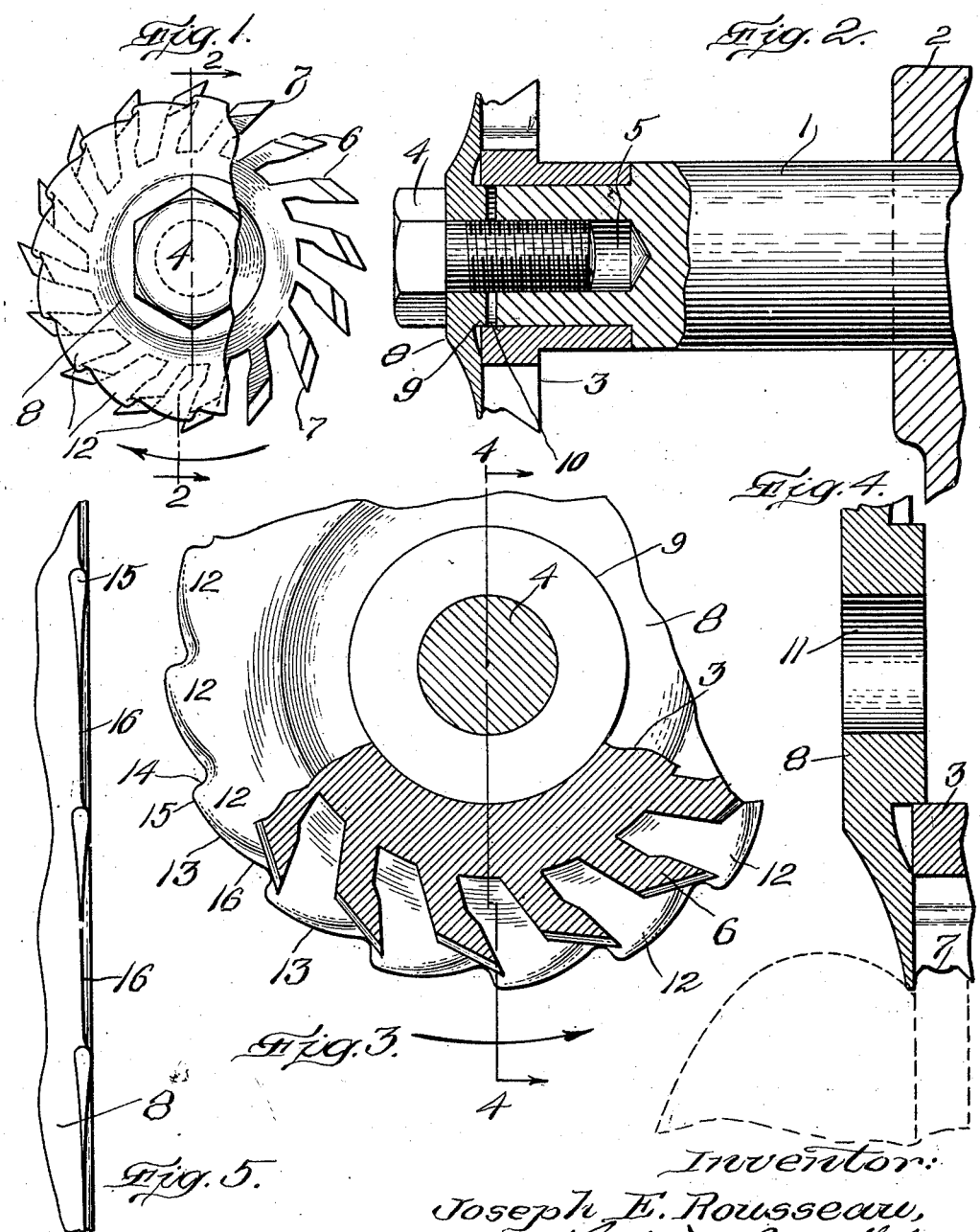
Inventor:
Joseph E. Rousseau,
by Arthur E. Randall Atty.

Patented June 10, 1930

1,763,370

UNITED STATES PATENT OFFICE

JOSEPH E. ROUSSEAU, OF HAVERHILL, MASSACHUSETTS, ASSIGNOR OF ONE-HALF TO ARTHUR C. MURPHY, OF HAVERHILL, MASSACHUSETTS

ROTARY CUTTER

Application filed August 22, 1929. Serial No. 387,741.

My invention relates to rotary cutters such as are employed to trim the edges of the soles of boots and shoes and it has for its object to provide an improved cutter of this class.

The well known Bussell edge trimming machine comprises a rotary cutter head that is driven at a high rate of speed and to which the edge of the sole of a boot or shoe is presented to cause said head to trim and shape the same. My invention consists in providing a cutter head of this class with a single disk member fixed concentrically in position against the outer face thereof and made with a thin serrated inseam-engaging peripheral or marginal portion that provides a plurality of peculiarly shaped and constructed teeth, each having an eccentrically arcuate circumferentially disposed side edge.

This disk member is made somewhat larger in diameter than the adjacent side or face of the main cutter head against which it is fitted so that its thin marginal edge will occupy the inseam of the shoe thereby to guide the latter in its movements.

Also, the disk member provides a lateral support for the material of the sole edge so that the same is held thereby in the path of the cutting edges of the main cutter head and a cleanly and evenly trimmed edge is produced on the sole that is free of "feathers" at its top corner.

In one form of this invention the arcuate side edge of each tooth of the disk member may be constructed in part as a knife edge and in part as a shield by which the upper of the shoe is protected from said knife edge.

Other features and advantages of my invention are hereinafter pointed out.

In the accompanying drawings:—

Figure 1 is a front elevation partly broken away and somewhat enlarged of a rotary edge trimming cutter constructed in accordance with my invention.

Figure 2 is a section on line 2—2 of Fig. 1.

Figure 3 is a rear elevation of a portion of the disk member enlarged about three times and showing also, in section, a portion of the main cutter head.

Figure 4 is a section on line 4—4 of Fig. 3.

Figure 5 is an edge view, enlarged about six times of a portion of the disk member.

An edge trimming mechanism of the class to which my invention relates comprises a shaft 1 carrying a pulley, not shown, through which it is driven at a high rate of speed, said shaft being journalled in bearings, one of which is shown at 2.

Upon the outer end of the shaft 1 is mounted the usual toothed cutter head 3 which is fixed in position thereon by means of a screw 4 whose threaded shank occupies a threaded aperture or hole 5 provided at the outer end of shaft 1.

The cutter head 3 is made with teeth 6 having front cutting edges 7 formed to give the desired shape to the edge of the sole that is trimmed.

In accordance with my invention I combine, with the cutter head 3, a supplemental disc member 8 having at its middle, and upon its inner face, a boss 9 fitting telescopically within the hole 10 provided at the middle of the cutter head 3 to receive the reduced end portion of the shaft 1. Also the disc member 8 is formed at its middle with a hole 11 to receive the shank of the screw 4. Disc member 8 is fitted against the outer face of the cutter head 3 with its boss 9 fitting within the hole 10 of said cutter head and is rigidly clamped in this position by means of the screw 4.

The outer peripheral or marginal portion of the disc member 8 is made very thin and is serrated so as to provide the same with teeth 12 which project outwardly beyond the immediately adjacent portions of the cutting edges of the teeth 6 of the cutter head 3 as shown clearly in Figs. 3 and 4. That is, the disc member 8 has an outside diameter which is greater than the outside diameter of the immediately adjacent side or face of the cutter head 3 but the base of each tooth 12, or in other words the bottom of the notch between each two teeth 12, is nearer the axis of the cutter head than the outer ends of the adjacent portions of the teeth 6 as shown in Fig. 3.

Each tooth 12 has a relatively long front side edge 13 and a relatively short abrupt rear side edge 14 and each relatively long front side edge 13 is made eccentrically arcuate so that as the cutter is rotated each front edge 13 is brought into engagement with the shoe by an oblique wiping movement.

A feature of the invention consists in making each tooth 12 relatively thick and blunt at its tip 15 and in making said front edge 13 so as to gradually taper from said blunt tip to a knife edge 16 adjacent the base of the tooth whch may, or may not, be a cutting edge, as desired.

When the cutter is in use the edge of the sole of the shoe is placed against the cutter head 3 as indicated by dotted lines in Fig. 4 and then, while the cutter head is rapidly rotated in the direction of the arrow, Fig. 3, the shoe is rotated in a left hand direction so as to cause the cutter head to traverse the edge of the sole from the rear of the shank at one side of the shoe around the fore part to the rear of the shank at the opposite side of the shoe. During this time the serrated edge of the disc member 8 occupies a position within the inseam of the shoe thereby steadying and guiding the latter during its movement and it will be clear that as the trimming operation progresses, the front arcuate edge 13 of each tooth 12 strikes obliquely into the inseam thereby wedging its way into the latter and crowding the material of the sole into the path of the cutting edges 7 of head 3. Thus a trimmed edge is produced upon the sole which is devoid of objectionable feathers at its top corner, and the more or less fibrous top portion of the sole that is engaged by the teeth 12 is beaten down and finished by said teeth in a very desirable fashion.

If desired the knife edges 16 may be made sufficiently sharp to have a cutting function so that any loose fibres projecting into their path are removed thereby.

What I claim is:—

1. A rotary cutter of the character described comprising a main toothed cutter head for operating upon the edge of a sole, and a single supplemental disc member of larger outside diameter fixed concentrically in position against the outer face of said main cutter head and constructed with a thin serrated inseam-engaging peripheral portion whereof each tooth is made with a relatively long eccentrically arcuate convex circumferentially disposed edge at one side thereof and with an abrupt relatively short edge at the opposite side thereof.

2. A rotary cutter of the character described comprising a main toothed cutter head for operating upon the edge of a sole, and a single supplemental disc member of larger outside diameter fixed concentrically in position against the outer face of said main cutter head and constructed with a thin serrated inseam-engaging peripheral portion whereof each tooth is made with a relatively long eccentrically arcuate convex circumferentially disposed front side edge and with an abrupt relatively short rear side edge.

3. A rotary cutter of the character described comprising a main toothed cutter head for operating upon the edge of a sole and a single supplemental disc member of larger diameter fixed concentrically in position against the outer face of said main cutter head and constructed with a thin serrated inseam-engaging peripheral portion whereof each tooth is made with a relatively long eccentrically arcuate convex circumferentially disposed front side edge and with an abrupt relatively short rear side edge, the tip portion of said relatively long front side edge being made blunt and relatively thick, and said front side edge being made tapering in thickness from said tip to the base portion thereof.

4. A rotary cutter of the character described constructed in accordance with claim 1 and wherein the inner base portion of said relatively long side edge is made as a knife edge, and the outer portion thereof is made blunt so as to serve as a shield.

Signed by me at Haverhill, Essex County, Massachusetts, this 13th day of August, 1929.

JOSEPH E. ROUSSEAU.